United States Patent
Kim

Patent Number: 5,769,752
Date of Patent: Jun. 23, 1998

[54] CONTROL SYSTEM FOR A VEHICLE TRANSMISSION TO PREVENT A STOPPED VEHICLE FROM ROLLING ON A SLOPE

[75] Inventor: Jong-Ho Kim, Seoul, Rep. of Korea

[73] Assignee: Hyundai Motor Company, Seoul, Rep. of Korea

[21] Appl. No.: 769,392

[22] Filed: Dec. 19, 1996

[30]    Foreign Application Priority Data

Dec. 19, 1995 [KR] Rep. of Korea ...................... 95-52034

[51] Int. Cl.⁶ .................................................. F16H 61/20
[52] U.S. Cl. .......................... 477/114; 477/174; 477/901; 477/86
[58] Field of Search ............................. 477/93, 114, 117, 477/174, 901

[56]    References Cited

U.S. PATENT DOCUMENTS

| | | |
|---|---|---|
| 3,881,368 | 5/1975 | Furuhashi et al. ...................... 477/119 |
| 4,114,476 | 9/1978 | Fini, Jr. . |
| 4,126,054 | 11/1978 | Langford et al. . |
| 4,133,224 | 1/1979 | Blomquist . |
| 4,335,428 | 6/1982 | Miki et al. .......................... 477/901 X |
| 4,350,234 | 9/1982 | Suga et al. .......................... 477/901 X |
| 4,471,437 | 9/1984 | Yoshino et al. ...................... 477/901 X |
| 4,475,637 | 10/1984 | Oguma et al. ............................. 477/86 |
| 4,513,638 | 4/1985 | Nishikawa et al. . |
| 4,591,038 | 5/1986 | Asagi et al. . |
| 4,669,591 | 6/1987 | Sakakiyama ........................ 477/174 X |
| 4,676,115 | 6/1987 | Morscheck et al. . |
| 4,717,207 | 1/1988 | Kubota et al. ....................... 477/182 X |
| 4,722,248 | 2/1988 | Braun . |
| 4,776,239 | 10/1988 | Sassi et al. . |
| 4,817,470 | 4/1989 | Müller . |
| 4,821,854 | 4/1989 | Koshizawa .......................... 477/901 X |
| 4,916,979 | 4/1990 | Irwin . |
| 4,947,331 | 8/1990 | Speranza . |
| 5,050,079 | 9/1991 | Steeby . |
| 5,053,959 | 10/1991 | Genise . |
| 5,053,961 | 10/1991 | Genise . |
| 5,053,962 | 10/1991 | Genise . |
| 5,063,511 | 11/1991 | Mack et al. . |
| 5,089,962 | 2/1992 | Steeby . |
| 5,099,969 | 3/1992 | Ohtake . |
| 5,408,895 | 4/1995 | Chan et al. . |
| 5,444,623 | 8/1995 | Genise . |
| 5,452,946 | 9/1995 | Warner ................................ 477/186 X |

FOREIGN PATENT DOCUMENTS 2 066 919    7/1981    United Kingdom .

*Primary Examiner*—Charles A. Marmor
*Assistant Examiner*—Peter T. Kwon
*Attorney, Agent, or Firm*—Finnegan, Henderson, Farabow, Garrett & Dunner, L.L.P.

[57]    ABSTRACT

A control system for a vehicle transmission prevents a vehicle from rolling backward on a slope, and includes a slope sensor for sensing the degree of a slope, a throttle position sensor for sensing position of a throttle valve, an engine RPM sensor for detecting RPM of the engine, a gear input speed sensor for sensing rotational speed of a transmission gear, a gear position sensor for sensing position of the transmission gear, a shift lever sensor for sensing operation of a shift lever, a CPU for reading signals from the sensors and outputting a control signal for keeping the clutch in partial engagement before starting an engine, an electric hydraulic pressure cylinder, and a clutch release cylinder mechanically joined to the electric hydraulic pressure cylinder for joining the clutch.

12 Claims, 2 Drawing Sheets

CONTROL SYSTEM FOR A VEHICLE TRANSMISSION TO PREVENT A STOPPED VEHICLE FROM ROLLING ON A SLOPE

BACKGROUND OF THE INVENTION

1. Field of the Invention

The present invention relates to a control system of a vehicle transmission, for preventing the vehicle from rolling on a slope. More particularly, the present invention relates to a control system and a method, particularly suited for a semi-automatic transmission, for preventing the vehicle from rolling backward by automatically maintaining a partial engagement of the clutch while the vehicle is stopped on a slope.

2. Description of the Related Art

Generally, a vehicle transmission automatically changes revolutions per minute (RPM) and rotational power of an engine. An automatic transmission provides a driver with easier driving capability, better responsiveness to speed changes, reduced noise, and a reduced possibility of engine stall, as compared to a manual transmission. On the other hand, an automatic transmission also results in a poor fuel combustion ratio, a heavier engine, and a higher price than a manual transmission. Also, an automatic transmission is more difficult to troubleshoot than a manual transmission.

In order to take advantage of the features of both an automatic transmission and a manual transmission, a semi-automatic transmission has been studied. However, the conventional semi-automatic transmission has a problem in that the vehicle rolls backward when starting an engine on a slope, or when starting to move after the vehicle is, e.g., stopped at a stop light or the like, on a slope. As a result, the vehicle can roll backward and bump a following vehicle, thereby causing a traffic accident.

SUMMARY OF THE INVENTION

The present invention has been made in an effort to solve the above-mentioned problems. An important advantage of the present invention is the provision of a control system for a vehicle transmission for preventing the vehicle from rolling when starting on a slope.

Additional features and advantages of the invention will be set forth in the description which follows, and in part will be obvious from the description, or may be learned by practice of the invention. The objectives and other advantages of the invention may be realized and attained by the apparatus particularly pointed out in the written description and claims hereof, as well as the appended drawings.

To achieve these and other advantages, and in accordance with the purpose of the invention, as embodied and broadly described, a control system of a vehicle transmission for preventing a vehicle from rolling on a slope comprises a slope sensor for sensing the degree of the slope, changing it into an electrical signal and outputting the electrical signal; a processor for receiving the electrical signal from the slope sensor and, when the vehicle is stopped on the slope, for creating a clutch control signal; a hydraulic pressure cylinder for generating a hydraulic pressure in response to the clutch control signal; and a clutch cylinder for receiving the hydraulic pressure and for maintaining a partial engagement of the clutch, thereby preventing the stopped vehicle from rolling down the slope.

The invention further comprises a throttle position sensor for sensing an opening position of a throttle valve, changing it into an electrical signal and outputting the electrical signal.

The invention further comprises an engine RPM sensor for detecting RPM of the engine, changing it into an electrical signal and outputting the electrical signal.

The invention further comprises a gear input speed sensor for sensing rotational speed of a transmission gear, changing it into an electrical signal and outputting the electrical signal.

The invention further comprises a gear position sensor for sensing position of the transmission gear, changing it into an electrical signal and outputting the electrical signal.

The invention further comprises a shift lever sensor for sensing operation of a shift lever, changing it into an electrical signal and outputting the electrical signal.

The invention further comprises an operation switch by which a driver can selectively operate the transmission according to one's need.

The invention also includes a method of preventing a vehicle from rolling on a slope by maintaining partial engagement of a clutch before starting the vehicle from a stopped condition on the slope, comprising the steps of initializing memory variables when power is applied; determining whether or not an operation switch is on by reading an input signal from the operation switch; determining whether or not a throttle valve is closed if the operation switch is on; determining whether or not a shift lever is in a neutral position, and then separating a clutch if the shift lever is in the neutral position; determining whether or not a corresponding shift stage is selected by the shift lever; detecting a joining speed of the clutch if the corresponding shift stage is selected by the shift lever; determining whether or not a vehicle is on a slope, and maintaining partial engagement of the clutch if the vehicle is on a slope; and joining the clutch at the detected joining speed of the clutch.

BRIEF DESCRIPTION OF THE DRAWINGS

The above objects and features of the present invention will be apparent from the following description of the embodiment with reference to the accompanying drawings.

DESCRIPTION OF THE PREFERRED EMBODIMENT

Reference will now be made in detail to the present preferred embodiment of the present invention, an example of which is illustrated in the accompanying drawings.

Figure 1:
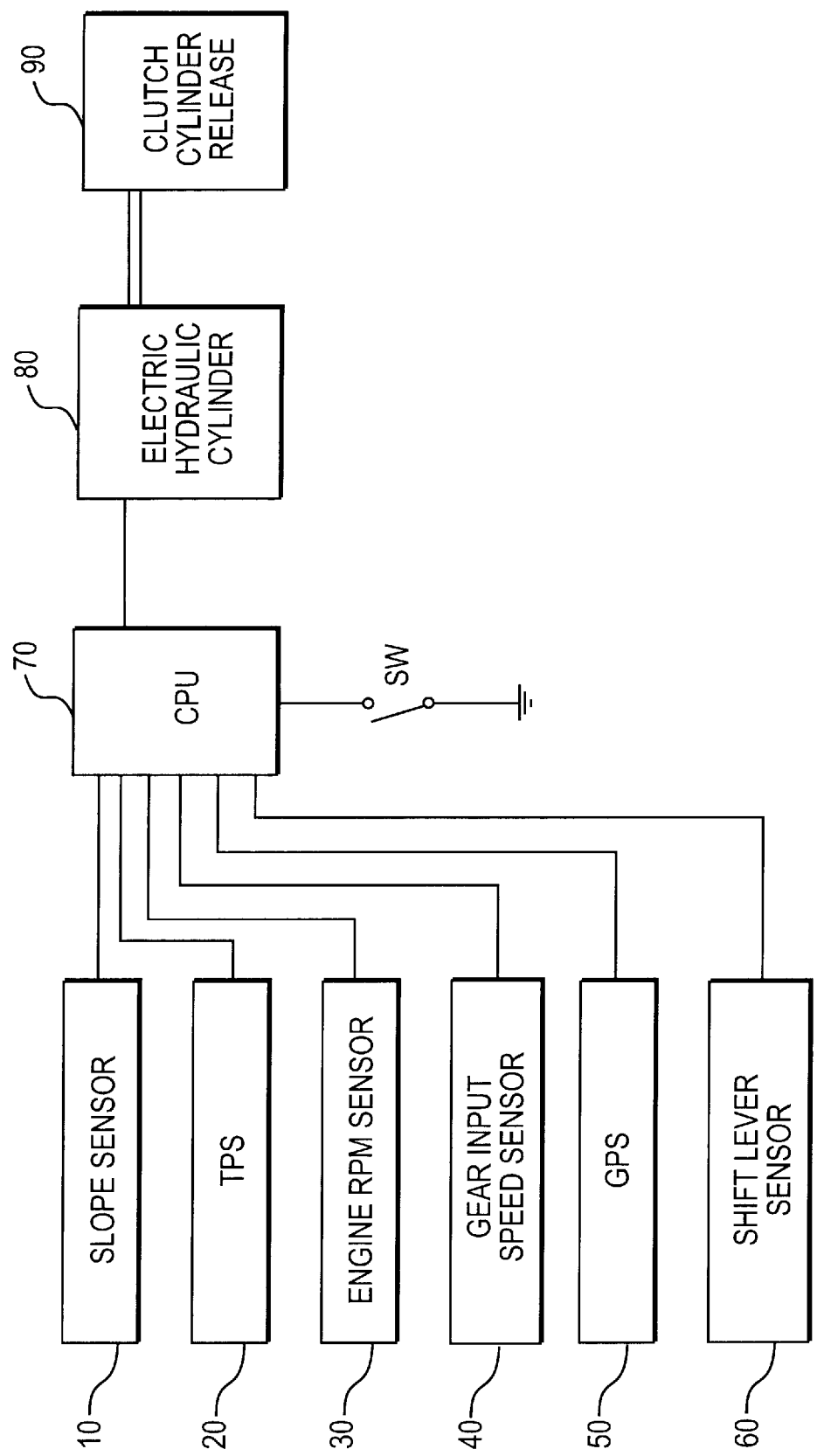
FIG. 1 is a diagram illustrating a circuit of a control system of a vehicle transmission for preventing a vehicle from rolling on a slope according to the present invention.

Referring to FIG. 1, a control system of a vehicle transmission, in this case a semi-automatic transmission, for preventing a vehicle from rolling backward on a slope is provided.

A slope sensor 10 is provided for sensing the degree of the slope on which a vehicle is positioned. Slope sensor 10 changes the sensed degree of the slope into an electrical signal, and outputs the electrical signal.

A throttle position sensor (TPS) 20 is provided for sensing an opening position of a throttle valve, operated by the vehicle accelerator pedal. The TPS 20 changes the sensed throttle position into an electrical signal and outputs the electrical signal.

An engine RPM sensor 30 is provided for detecting RPM of the vehicle engine. The RPM sensor 30 changes the sensed RPM into an electrical signal and outputs the electrical signal.

A gear input speed sensor 40 is provided for sensing rotational speed of a transmission gear. The sensor 40 changes the sensed rotational speed into an electrical signal and outputs the electrical signal.

A gear position sensor 50 is provided for sensing a position of the transmission gear. The sensor 50 changes the sensed transmission gear position changing it into an electrical signal and outputs the electrical signal.

A shift lever sensor 60 is provided for sensing an operation of a shift lever. The sensor 60 changes the sensed shift lever operation into an electrical signal and outputs the electrical signal.

An operation switch SW provides electrical power to a CPU 70 when the switch SW is closed.

A central processing unit 70, having an internal analog/digital converter and an internal memory is provided. CPU 70 receives as input the electrical signals from the above-mentioned sensors 10–60.

An electric hydraulic pressure cylinder 80 is provided. The electric hydraulic pressure cylinder 80 receives as input the output of the central processing unit 70 and is powered by an electric motor (not shown).

A clutch release cylinder 90 is mechanically joined to the electric hydraulic pressure cylinder 80.

In its broadest sense, the control system of the invention comprises the slope sensor 10 which senses a degree of slope on which the vehicle is stopped, with the engine either idling or turned off completely. The slope sensor 10 converts this sensed degree into an electrical signal, which is outputted to CPU 70. If the vehicle is stopped on a slope, CPU 70 generates a clutch control signal that is sent to electric hydraulic pressure cylinder 80. Hydraulic pressure is generated, and received by clutch cylinder 90, which partially engages the vehicle clutch to prevent slippage. With the clutch in partial engagement, the vehicle will not roll backward down the hill before it can be put into gear.

In another aspect of the invention, in addition to the slope sensor 10, the control system includes engine RPM sensor 30, gear input speed sensor 40, and gear position sensor 50. These three components operate together to sense a joining speed of the clutch. When the vehicle is stopped on a slope, and the clutch joining speed is slow, the vehicle is likely to roll backward. To prevent this, in response to electrical signals from these four sensors, CPU 70 sends a clutch control signal to electric hydraulic pressure cylinder 80 to generate pressure transmitted to clutch cylinder 90, in order to partially engage the clutch and prevent the vehicle from rolling backward down the slope.

Figure 2:
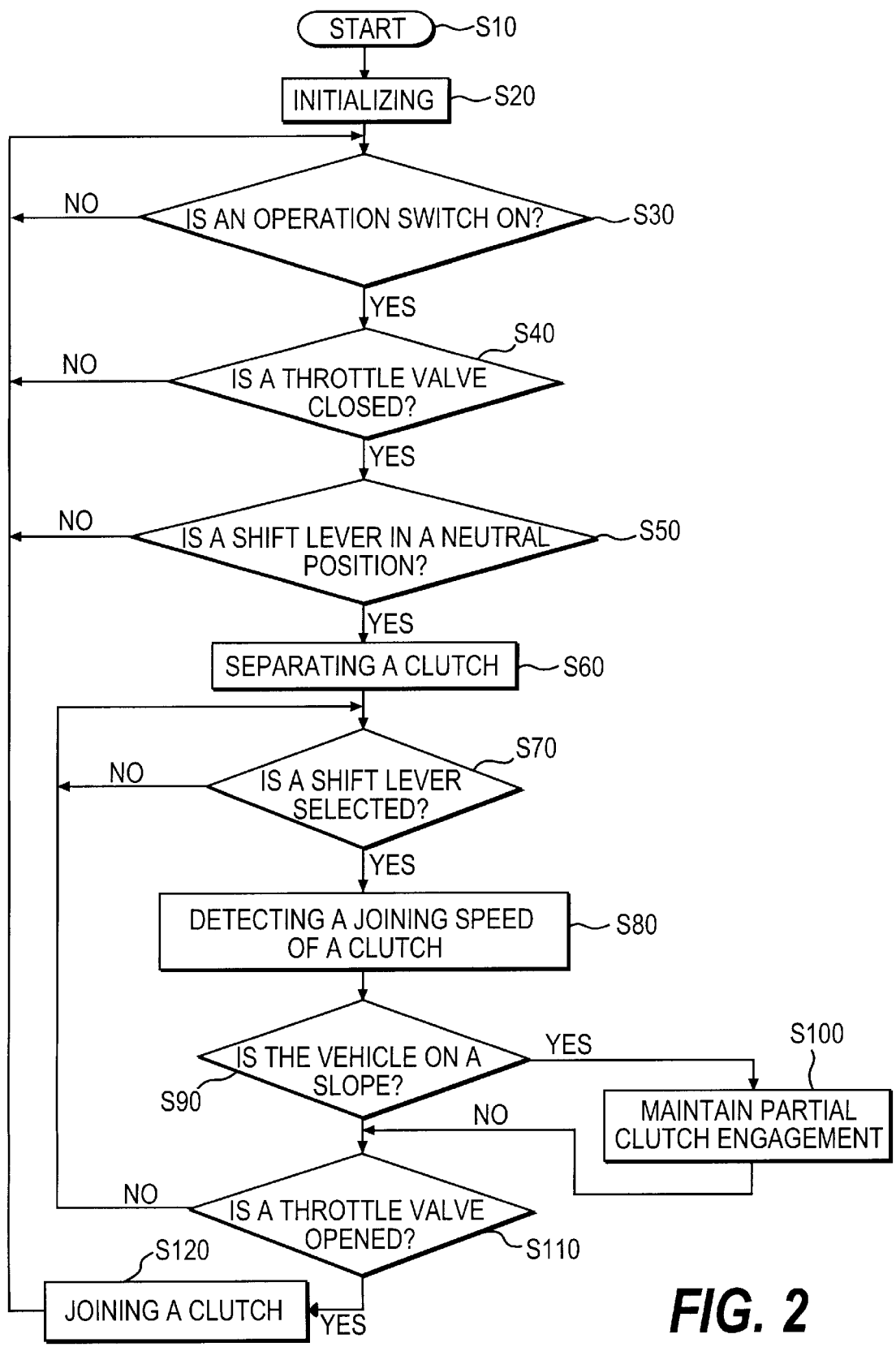
FIG. 2 is a flow chart illustrating a method for preventing a vehicle from rolling on a slope according to the present invention.

Referring next to FIG. 2, a method for controlling a vehicle transmission, in this case a semi-automatic transmission, for preventing a vehicle from rolling on a slope according to the preferred embodiment of the present invention comprises the following steps.

First, power is applied at S10.

Next, all memory variables are initiated at S20.

Next, the system determines whether or not the operation switch is on at S30.

Next, the system determines whether or not the throttle valve is closed at S40.

Next, the system determines whether or not the shift lever is in a neutral position S50.

Next, the system separates the clutch if the shift lever is in the neutral position at S60.

Next, the system determines whether or not a corresponding shift stage is selected by the shift lever at S70.

Next, the system detects a joining speed of the clutch if the corresponding shift stage is selected by the shift lever at S80.

Next, the system determines whether or not a vehicle is on a slope at S90.

Next, the system maintains partial engagement of the clutch if the vehicle is on a slope at S100.

Next, the system determines whether or not the throttle valve is opened at S110.

Finally, the system joins the clutch at the detected joining speed of the clutch at S120.

The operation of the control system of the invention for preventing a vehicle from rolling on a slope, as broadly embodied herein, will now be explained.

Power is applied to CPU 70 when a driver closes switch SW. The CPU 70 performs programmed operations stored in an internal memory device, as illustrated in FIG. 2, starting its operations (step S10).

The CPU 70 initializes all memory variables (step S20) and reads the input signal from the operation switch SW, thereby determining whether or not the operation switch SW is on (step S30). If the operation switch SW is on, the CPU 70 reads the input signal from the throttle position sensor 20, thereby determining whether or not the throttle valve is open or closed at (step S40). If the throttle valve is closed, namely the driver is not depressing the accelerator pedal, the CPU 70 determines whether or not the shift lever is in the neutral position (step S50) by reading the input signal from the shift lever 60. If the shift lever is in the neutral position, the CPU 70 outputs a control signal to the electric hydraulic pressure cylinder 80, thereby separating the clutch by the electric hydraulic cylinder 80 (step S60). The CPU 70 then reads the input signal from the shift lever sensor 60, thereby determining whether or not the corresponding shift stage is selected by the shift lever (step S70). The CPU 70 also reads the input signals from the sensors such as the engine RPM sensor 30, the gear input speed sensor 40 and the gear position sensor 50, thereby detecting a joining speed of the clutch (step S80) if the corresponding shift stage is selected by the shift lever. The CPU 70 also reads the input signal from the slope sensor 10 thereby determining whether or not the vehicle is on a slope (step S90). If the vehicle is on a slope, the CPU 70 outputs the control signal to the electric hydraulic pressure cylinder 80, thereby maintaining the clutch partially engaged (step S100) by operating the clutch release cylinder 90 via the electric hydraulic pressure cylinder 80. The CPU 70 reads the input signal from the throttle position sensor 20, thereby determining whether or not the throttle valve is opened, which means that the driver has depressed the accelerator pedal (step S110). If the throttle valve is opened, the CPU 70 outputs a control signal to the electric hydraulic pressure cylinder 80, thus joining the clutch at the detected joining speed of the clutch (step S120) by operating the clutch release cylinder 90 via the electric hydraulic pressure cylinder 80.

In accordance with the preferred embodiment of the present invention, when starting a vehicle parked on a slope, a control system for a semi-automatic vehicle transmission can prevent the vehicle from rolling on a slope, e.g., rolling backward on a hill, by maintaining a partial engagement of the clutch. Likewise, if the vehicle is simply stopped on a slope, e.g., stopped at a stop light, the system will maintain partial engagement of the clutch to prevent the vehicle from rolling backward before it can start forward again.

The preferred embodiment was described in reference to a semi-automatic transmission. The invention is not so limited however. The control system also can be used with a manual transmission.

Additional advantages and modifications will readily occur to those skilled in the art. The invention in its broad aspects, therefore, is not limited to the specific details provided above. Departure may be made from such details without departing from the invention, which is defined by the claims and their equivalents.

What is claimed is:

1. A control system for a vehicle transmission comprising:
 a slope sensor for sensing a degree of a slope on which the vehicle is positioned, for converting the sensed degree of slope into an electrical signal, and for outputting the electrical signal;
 a processor for receiving the electrical signal from the slope sensor and, when the vehicle is stopped on the slope, for generating a clutch control signal;
 a hydraulic pressure cylinder for generating hydraulic pressure in response to the clutch control signal; and
 a clutch cylinder for receiving the hydraulic pressure and for maintaining a partial engagement of the clutch, thereby preventing the stopped vehicle from rolling down the slope.

2. The control system of claim 1, further comprising a throttle position sensor for sensing position of a throttle valve of the vehicle, for converting the sensed position into an electrical signal, and for outputting the electrical signal to the processor.

3. The control system of claim 1, further comprising an engine RPM sensor for detecting speed of an engine of the vehicle, for converting the sensed engine speed into an electrical signal, and for outputting the electrical signal to the processor.

4. The control system of claim 1, further comprising a gear input speed sensor for sensing rotational speed of a transmission gear of the vehicle, for converting the sensed rotational speed into an electrical signal, and for outputting the electrical signal to the processor.

5. The control system of claim 1, further comprising a gear position sensor for sensing position of a transmission gear of the vehicle, for converting the sensed position into an electrical signal, and for outputting the electrical signal to the processor.

6. The control system of claim 1, further comprising a shift lever sensor for sensing operation of a shift lever, for converting the sensed operation into an electrical signal, and for outputting the electrical signal to the processor.

7. The control system of claim 1, wherein the processor generates the clutch control signal when the vehicle is stopped on the slope and the vehicle engine is off.

8. The control system of claim 1, wherein the processor generates the clutch control signal when the vehicle is stopped on the slope and the vehicle engine is idling.

9. The control system of claim 1, wherein the hydraulic pressure cylinder is powered by an electric motor.

10. The control system of claim 1, further comprising an operation switch for selectively operating the transmission.

11. A control system for a vehicle transmission, comprising:
 a slope sensor for sensing degree of a slope on which the vehicle is positioned, for converting the sensed degree of slope into a first electrical signal, and for outputting the first electrical signal;
 an engine RPM sensor for detecting speed of an engine of the vehicle, converting the sensed engine speed into a second electrical signal, and for outputting the second electrical signal;
 a gear input speed sensor for sensing rotational speed of a transmission gear of the vehicle, for converting the sensed rotational speed into a third electrical signal, and for outputting the third electrical signal;
 a gear position sensor for sensing position of the transmission gear, for converting the sensed position into a fourth electrical signal, and for outputting the fourth electrical signal;
 a processor for receiving the electrical signals and, in response to the electrical signals, for generating a clutch control signal;
 a hydraulic pressure cylinder for creating hydraulic pressure in response to the clutch control signal; and
 a clutch cylinder for receiving the hydraulic pressure and for maintaining partial engagement of the clutch, thereby preventing the stopped vehicle from rolling down the slope.

12. A method of controlling a vehicle transmission, comprising:
 determining whether a throttle valve of the vehicle is closed;
 determining whether a shift lever of the vehicle is in a neutral position when the throttle valve is closed;
 separating a clutch of the vehicle when the shift lever is in the neutral position;
 determining whether the shift lever is selected to a corresponding shift stage;
 detecting joining speed of the clutch when the shift lever is selected to a corresponding shift stage;
 determining whether the vehicle is stopped on a slope;
 maintaining the clutch partially engaged when the vehicle is stopped on a slope; and
 joining the clutch at the detected clutch joining speed.

* * * * *